US011658719B2

(12) United States Patent
Horn et al.

(10) Patent No.: US 11,658,719 B2
(45) Date of Patent: May 23, 2023

(54) HYBRID BEAMFORMING WITH A BUTLER MATRIX

(71) Applicant: QUALCOMM Incorporated, San Diego, CA (US)

(72) Inventors: Idan Michael Horn, Hod Hasharon (IL); Shay Landis, Hod Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/350,564

(22) Filed: Jun. 17, 2021

(65) Prior Publication Data

US 2021/0409087 A1 Dec. 30, 2021

Related U.S. Application Data

(60) Provisional application No. 63/043,947, filed on Jun. 25, 2020.

(51) Int. Cl.
*H04B 7/06* (2006.01)

(52) U.S. Cl.
CPC ........ *H04B 7/0686* (2013.01); *H04B 7/0617* (2013.01); *H04B 7/0639* (2013.01); *H04B 7/0663* (2013.01)

(58) Field of Classification Search
CPC .. H04B 7/0686; H04B 7/0617; H04B 7/0639; H04B 7/0663
See application file for complete search history.

(56) References Cited

U.S. PATENT DOCUMENTS

| 5,410,320 A * | 4/1995 | Rudish ..................... H01Q 3/40 342/368 |
| 8,743,914 B1* | 6/2014 | Jensen ................... H04B 7/086 370/537 |
| 9,615,266 B1* | 4/2017 | Cheadle ................. H01Q 19/32 |
| 2016/0373938 A1* | 12/2016 | Chen ....................... H04W 16/28 |
| 2017/0062948 A1* | 3/2017 | Artemenko ............. H01Q 1/38 |
| 2017/0117629 A1* | 4/2017 | Thorebäck ............... H01Q 3/26 |
| 2018/0269946 A1* | 9/2018 | Choi ..................... H04W 24/08 |

(Continued)

FOREIGN PATENT DOCUMENTS

| EP | 0420739 B1 | 9/1993 |
| WO | WO-2017118468 A1 | 7/2017 |

OTHER PUBLICATIONS

Han Y., et al., "DFT-Based Hybrid Beamforming Multiuser Systems: Rate Analysis and Beam Selection", IEEE Journal of Selected Topics In Signal Processing, IEEE. US, vol. 12. No. 3, Jun. 1, 2018 (Jun. 1, 2018), pp. 514-528, XP011684367, pp. 1-15, ISSN: 1932-4553. DOI:10.1109/JSTSP.2018.2821104 [retrieved on May 30, 2018] Section II A, p. 516, figure 1.

(Continued)

*Primary Examiner* — Jaison Joseph
(74) *Attorney, Agent, or Firm* — Harrity & Harrity, LLP

(57) ABSTRACT

Various aspects of the present disclosure generally relate to wireless communication. In some aspects, a wireless communication device may select a set of terminals of a Butler matrix to use for transmitting or receiving one or more communications via one or more streams associated with one or more beams; and transmit or receive, using hybrid beamforming, the one or more streams via a set of antenna elements coupled to the Butler matrix. Numerous other aspects are provided.

30 Claims, 6 Drawing Sheets

(56) References Cited

U.S. PATENT DOCUMENTS

| | | | |
|---|---|---|---|
| 2020/0028556 A1* | 1/2020 | Inoue | H04B 7/0617 |
| 2020/0112328 A1* | 4/2020 | Andersson | H04B 1/44 |
| 2020/0245412 A1* | 7/2020 | Kumar | H04B 7/0617 |
| 2020/0296599 A1* | 9/2020 | Sasaki | H04B 7/0469 |

OTHER PUBLICATIONS

International Search Report and Written Opinion—PCT/US2021/070733—ISA/EPO—dated Sep. 29, 2021.

* cited by examiner

HYBRID BEAMFORMING WITH A BUTLER MATRIX

CROSS-REFERENCE TO RELATED APPLICATION

This Patent Application claims priority to U.S. Provisional Patent Application No. 63/043,947, filed on Jun. 25, 2020, entitled "HYBRID BEAMFORMING WITH A BUTLER MATRIX," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for hybrid beamforming with a Butler matrix.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless communication device, may include selecting a set of terminals of a Butler matrix to use for transmitting or receiving one or more communications via one or more streams associated with one or more beams; and transmitting or receiving, using hybrid beamforming, the one or more streams via a set of antenna elements coupled to the Butler matrix.

In some aspects, a wireless communication device for wireless communication may include a Butler matrix, memory, and one or more processors operatively coupled to the memory. The one or more processors may be configured to select a set of terminals of the Butler matrix to use for transmitting or receiving one or more communications via one or more streams associated with one or more beams; and transmit or receive, using hybrid beamforming, the one or more streams via a set of antenna elements, of the antenna array, that are coupled to the Butler matrix.

In some aspects, a non-transitory computer-readable medium may store one or more instructions for wireless communication. The one or more instructions, when executed by one or more processors of a wireless communication device, may cause the one or more processors to select a set of terminals of a Butler matrix to use for transmitting or receiving one or more communications via one or more streams associated with one or more beams; and transmit or receive, using hybrid beamforming, the one or more streams via a set of antenna elements coupled to the Butler matrix.

In some aspects, an apparatus for wireless communication may include means for selecting a set of terminals of a Butler matrix to use for transmitting or receiving one or more communications via one or more streams associated with one or more beams; and means for transmitting or receiving, using hybrid beamforming, the one or more streams via a set of antenna elements coupled to the Butler matrix.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
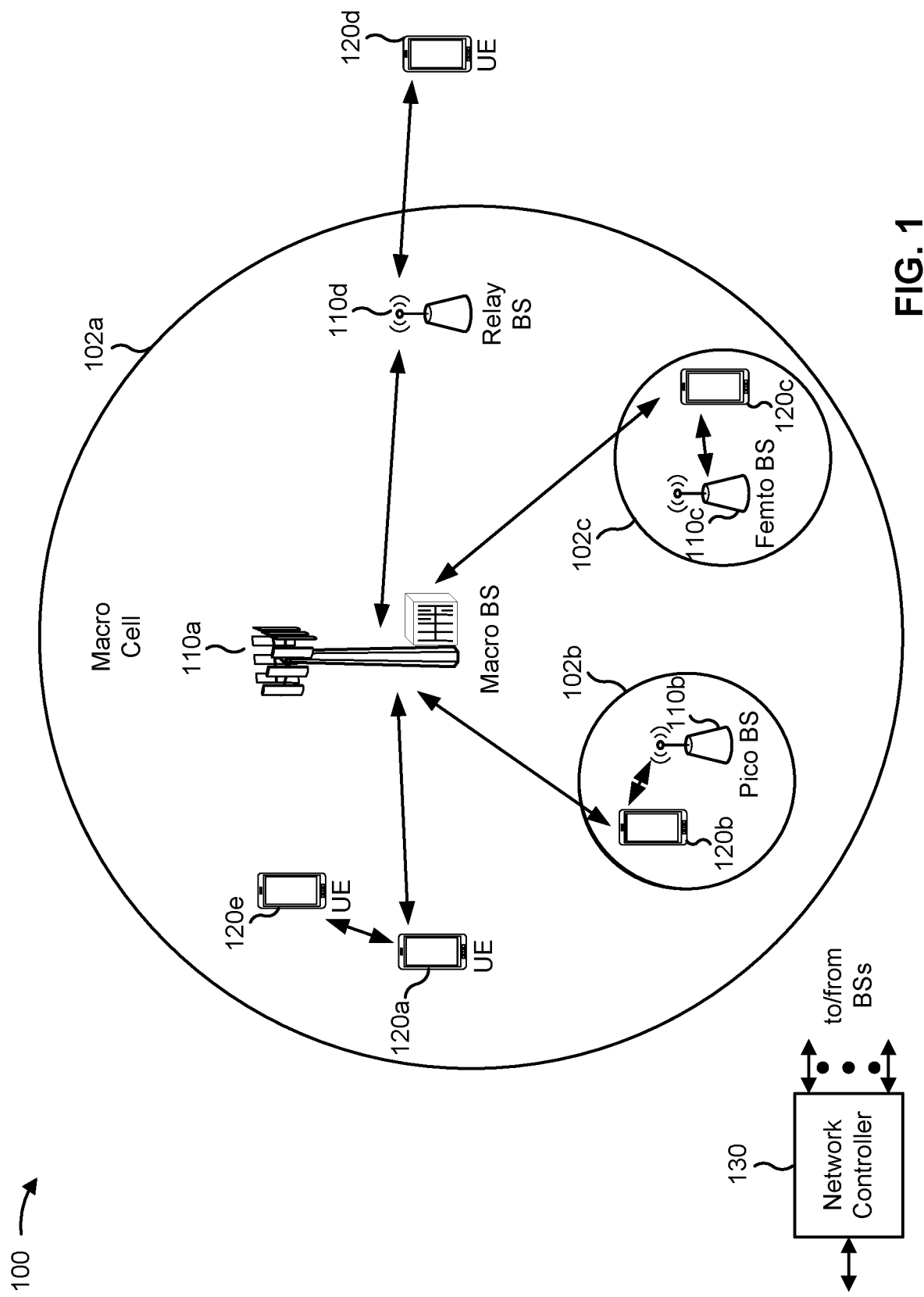
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
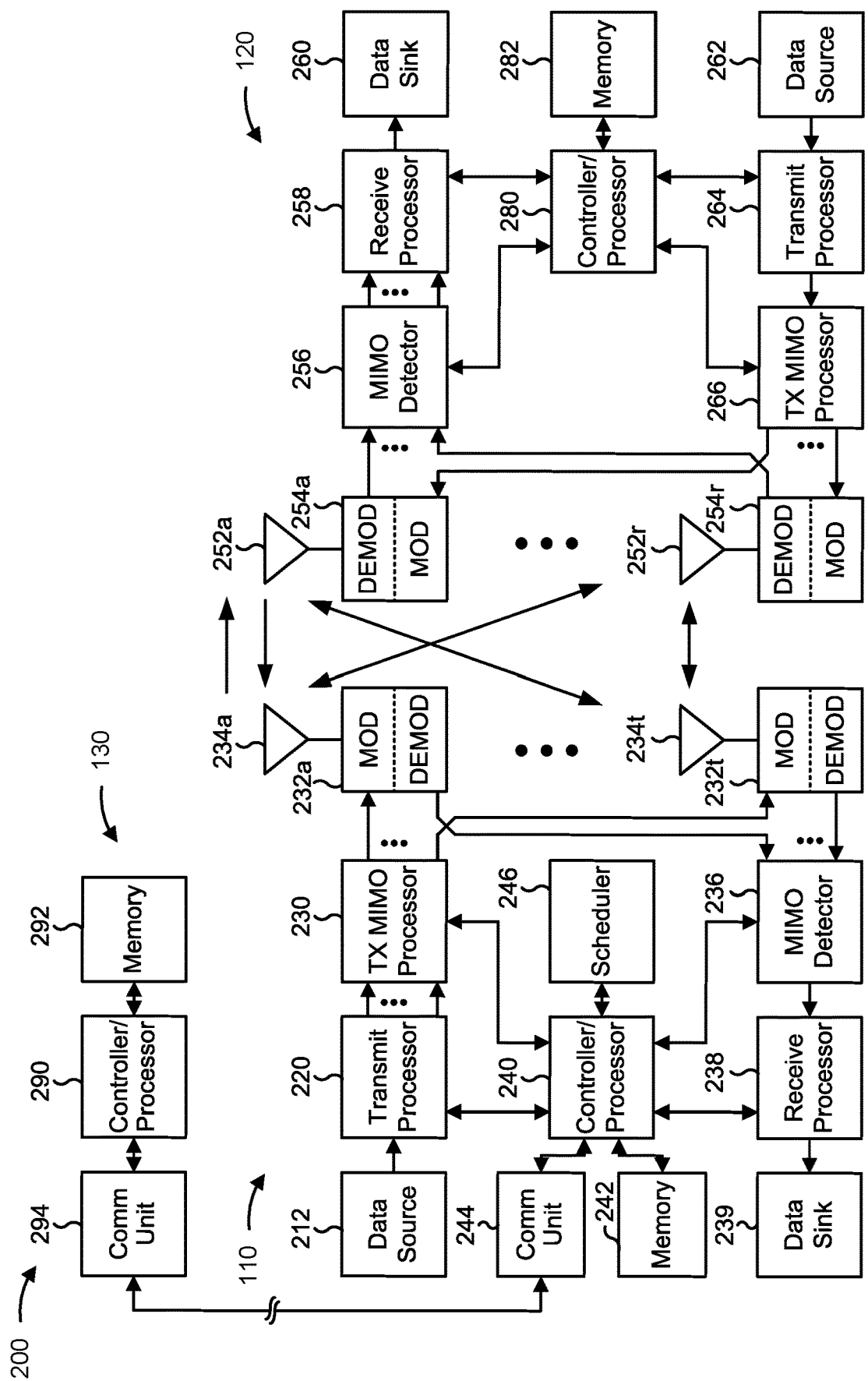
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 254t, may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-6).

Controller/processor 240 of base station 110, controller/processor 280 of UE 120, and/or any other component(s) of FIG. 2 may perform one or more techniques associated with hybrid beamforming with a Butler matrix, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some aspects, executing instructions may include running the instructions, converting the instructions, compiling the instructions, and/or interpreting the instructions, among other examples.

In some aspects, a wireless communication device (e.g., UE 120, base station 110, and/or the like) may include means for selecting a set of terminals of a Butler matrix to use for transmitting or receiving one or more communications via one or more streams associated with one or more beams; means for transmitting or receiving, using hybrid beamforming, the one or more streams via a set of antenna elements coupled to the Butler matrix; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
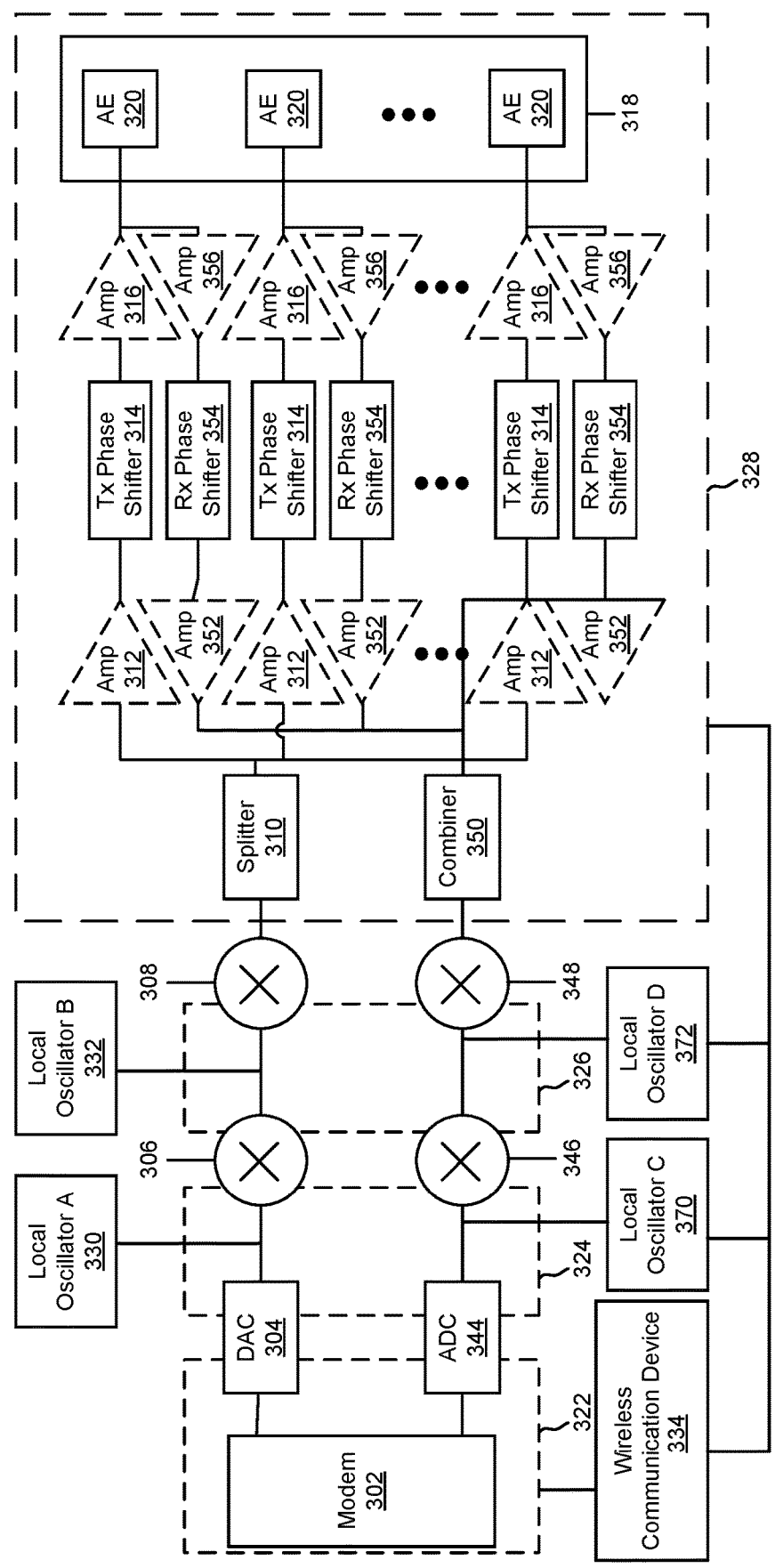
FIGS. 3 and 4 are diagrams illustrating examples associated with beamforming architecture that supports beamforming for millimeter wave communications, in accordance with the present disclosure.

FIG. 3 is a diagram illustrating an example beamforming architecture 300 that supports beamforming for millimeter wave (mmW) communications, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a wireless communication device 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antenna elements, dipole antenna elements, or other types of antenna elements arranged in a linear pattern, a two-dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similarly to the first mixer, the second mixer 308 may mix the signals with an oscillating signal generated by the local oscillator B 332 to "move" the IF analog signals to the RF or the frequency at which signals will be transmitted or received. The modem 302 and/or the wireless communication device 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the wireless communication device 334) to provide independent control of the gain for each antenna element 320. For example, the modem 302 and/or the wireless communication device 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters may introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 and/or the wireless communication device 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more Rx beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 and/or the wireless communication device 334 may have at least one control line connected to each of the phase shifters 354 and which may be used to configure the phase shifters to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the wireless communication device 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The wireless communication device 334 may be located partially or fully within one or more other components of the architecture 300. For example, the wireless communication device 334 may be located within the modem 302 in some aspects.

As indicated above, FIG. 3 is provided as an example. Other examples may differ from what is described with regard to FIG. 3.

Figure 4:
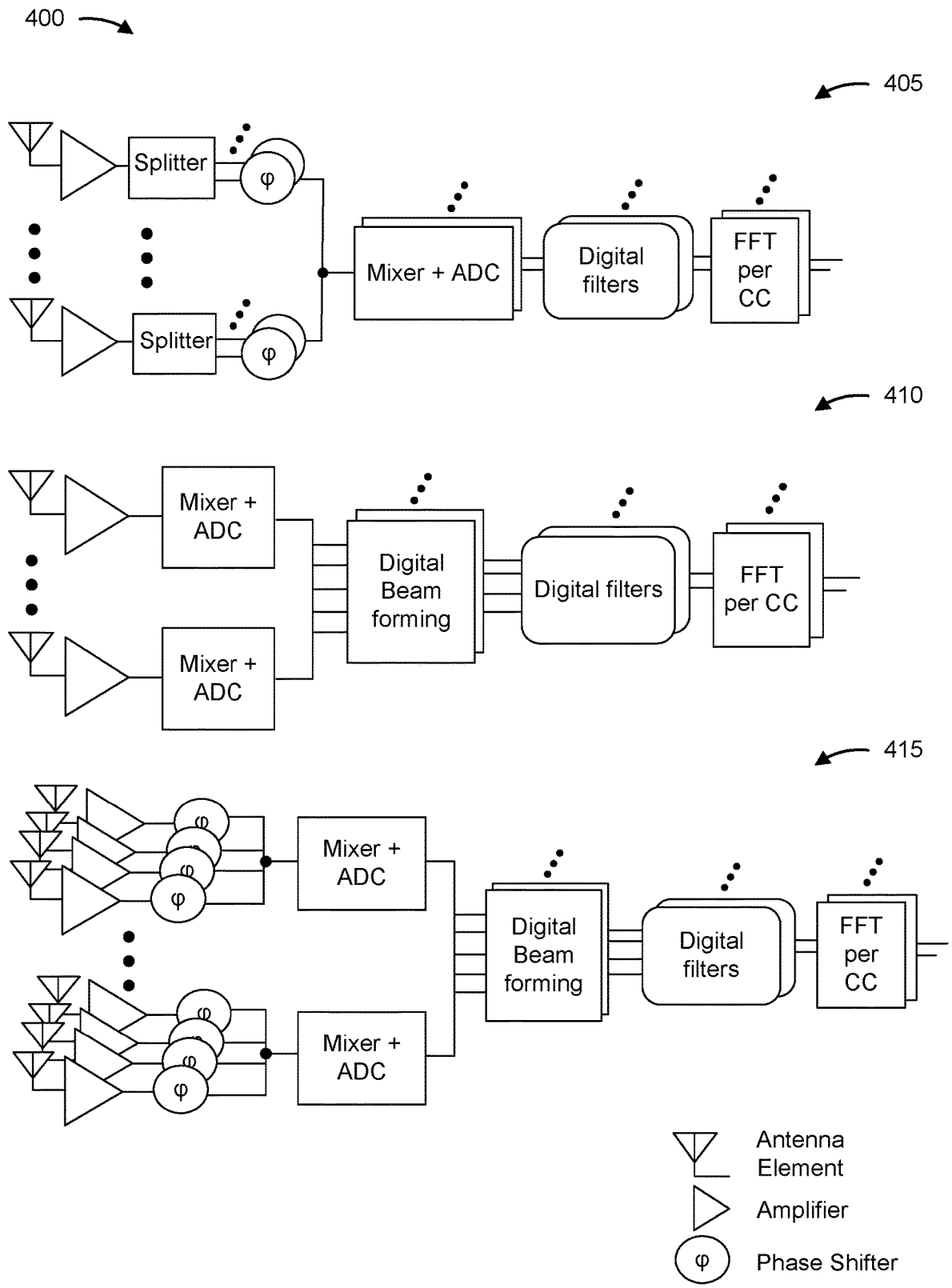

FIG. 4 is a diagram illustrating examples associated with beamforming architecture that supports beamforming for millimeter wave communications, in accordance with the present disclosure. Although the examples shown in FIG. 4 illustrate beamforming architecture for receiving communications, similar architecture may be used for transmitting communications.

As shown in FIG. 4, and by reference number 405, a wireless communication device may be configured with architecture for fully analog beamforming. The architecture for fully analog beamforming may include $N_{Rx}$ antenna elements that receive one or more streams of signals that are amplified by $N_{Rx}$ amplifiers. The architecture for fully analog beamforming may include $N_{Rx}$ splitters that split the one or more streams of signals into $N_{Streams}$ streams. The one or more streams of each splitter may be processed by respective phase shifters. This may require a number of $N_{Rx} \times N_{streams}$ hase shifters. Common streams from each splitter may be processed by $N_{Streams}$ mixers and/or ADCs. The common streams may be processed by $N_{Streams} \times N_{CCs}$ digital filters. The common streams may then be processed by $N_{Streams} \times N_{CCs}$ Fast Fourier Transform (FFT) components to produce an FFT per component carrier for each of the $N_{Streams} \times N_{CCs}$ streams. This may produce a number of $N_{Streams} \times N_{FFT}$ samples for further processing.

As shown by reference number 410, a wireless communication device may be configured with architecture for fully digital beamforming. The architecture for fully digital beamforming may include $N_{Rx}$ antenna elements that receive one or more streams of signals that are amplified by $N_{Rx}$ amplifiers. Signals from each amplifier may be processed by $N_{Rx}$ mixers and/or ADCs. Common streams from the mixers and/or ADCs may be processed by $N_{CCs}$ digital beamformers that receive $N_{Rx}$ signals and output an $N_{Streams}$ number of streams. The $N_{Streams}$ number of streams may be processed by $N_{Streams} \times N_{CCs}$ digital filters. The digitally filtered streams may then be processed by $N_{Streams} \times N_{CCs}$ FFT components to produce an FFT per component carrier for each of the $N_{Streams} \times N_{CCs}$ streams. This may produce a number of $N_{Streams} \times N_{FFT} \times N_{CC}$ samples for further processing. In some aspects, the fully digital phased array may generate negligible insertion loss.

As shown by reference number 415, a wireless communication device may be configured with architecture for hybrid beamforming. The architecture for hybrid beamforming may include $N_{Rx}$ antenna elements that receive one or more streams of signals that are amplified by $N_{Rx}$ amplifiers. The antenna elements may be grouped (e.g., shown as a group of 4) into groups of size $M_{Hybrid}$ antenna elements for hybrid beamforming. Signals from each amplifier of a group may be processed by a mixer and/or ADC. The architecture for hybrid beamforming may have $N_{Rx}/M_{Hybrid}$ mixers and/or ADCs. Common streams from the mixers and/or ADCs may be processed by $N_{CCs}$ digital beamformers that receive $N_{Rx}/M_{Hybrid}$ signals and output $N_{Streams}$ number of streams. The $N_{Streams}$ number of streams may be processed by $N_{Streams} \times N_{CCs}$ digital filters. The digitally filtered streams may then be processed by $N_{Streams} \times N_{CCs}$ FFT components to produce an FFT per component carrier for each of the $N_{Streams} \times N_{CCs}$ streams. This may produce a number of $N_{Streams} \times NFFT \times N_{CC}$ samples for further processing.

The architectures described above provide advantages in different applications (e.g., with different numbers of streams, different allowable power supplies, different signal strength communication, and/or the like). However, communications using multiple links may have high power consumption with each of the architectures described. For wireless communication devices that rely upon a battery for power, have limited heat dissipation capabilities, and/or the like, excessive power consumption may cause an architecture for transmitting and/or receiving multiple streams to be impractical.

As indicated above, FIG. 4 is provided as an example. Other examples may differ from what is described with regard to FIG. 4.

In some aspects described herein, a wireless communication device may use one or more Butler matrixes in an architecture for hybrid beamforming. For example, the Butler matrix may be used in place of the phase shifters shown at reference number 415 in the architecture for hybrid beamforming of FIG. 4. In some aspects, the architecture for hybrid beamforming may include switches coupled to terminals of the Butler matrixes. A switch coupled to a Butler matrix may be configured to terminate signals of a first set of terminals (e.g., selected based at least in part on input from the wireless communication device) and to provide signals of a second set of terminals to another component for additional processing.

Based at least in part on using one or more Butler matrixes in an architecture for hybrid beamforming, the wireless communication device may reduce power consumption, increase a number of receivable streams (e.g., for higher throughput), form narrower beam widths, provide higher spectral efficiency, and/or the like when compared to other architectures for beamforming. For example, by replacing phase shifter arrays with Butler matrixes in an architecture for hybrid beamforming, the wireless communication device may allow an increased number of links and/or similar power consumption. In some aspects, the architecture for hybrid beamforming with one or more Butler matrixes may be used to communicate using narrower beam widths when compared to an architecture for hybrid beamforming with one or more phase shifter arrays that uses a same number of links. In some aspects where links do not overlap (e.g., links are in different directions), the digital beamformer may be omitted (e.g., may pass through signals instead of processing the signals). In this way, the UE may reduce power consumption, which may facilitate practical use of multiple link communications. This may improve spectral efficiency of communications with the wireless communication device.

Figure 5:
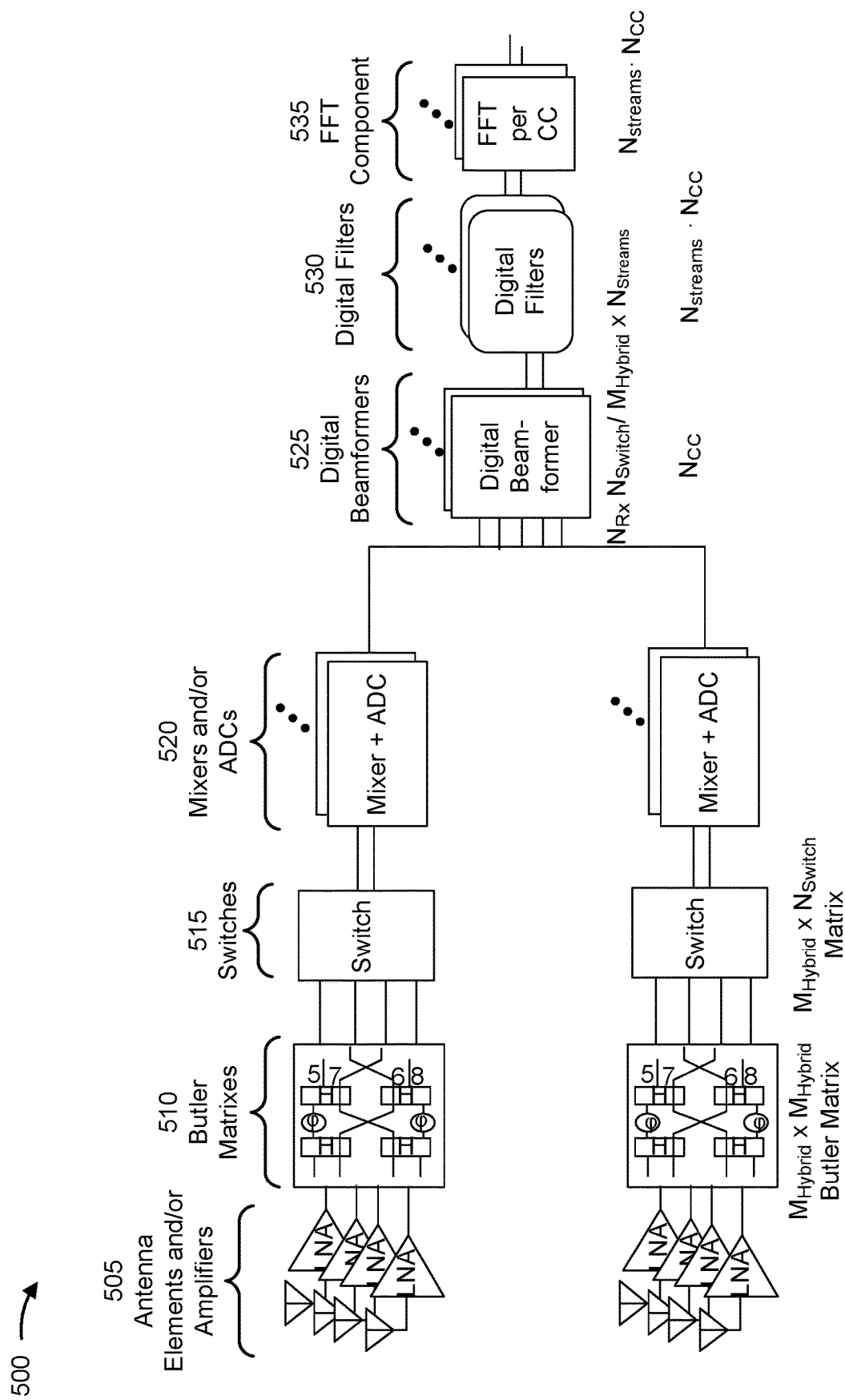
FIG. 5 is a diagram illustrating an example associated with hybrid beamforming with a Butler matrix, in accordance with the present disclosure.

FIG. 5 is a diagram illustrating an example associated with hybrid beamforming with a Butler matrix, in accordance with the present disclosure. A wireless communication device (e.g., base station 110, UE 120, and/or the like) may use architecture for hybrid beamforming with the Butler matrix to communicate with another wireless communication device.

As shown in FIG. 5, and by reference number 505, the architecture for hybrid beamforming with the Butler matrix may include $N_{Rx}$ antenna elements that receive one or more streams of signals that are amplified by $N_{Rx}$ amplifiers. In some aspects, the $N_{Rx}$ antenna elements may be coupled to $N_{Rx}$ amplifiers for transmitting signals via one or more beams. The antenna elements may be grouped (e.g., shown as a group of 4) into groups of size $M_{Hybrid}$ antenna elements for hybrid beamforming.

As shown by reference number 510, the antenna elements may be coupled to antenna terminals of Butler matrixes. The wireless communication device may have $N_{Rx}/M_{Hybrid}$ Butler matrixes. In some aspects, respective groups of antenna elements may be coupled to antenna terminals of a Butler matrix. The Butler matrix may be an $M_{Hybrid} \times M_{Hybrid}$ Butler matrix (e.g., a 2×2 Butler matrix, a 3×3 Butler matrix, a 4×4 Butler matrix, an 8×8 Butler matrix, a 9×9 Butler matrix, a 16×16 Butler matrix, and/or the like). The Butler matrix may be configured to passively apply (e.g., to apply without receiving input from the wireless communication device) beam steering by applying different phase shifts to signals on different terminals of the Butler matrix. In this way, terminals may represent orthogonal beam ports. The Butler matrix may be configured to apply a constant phase difference, and/or with a uniform distribution, to signals on different terminals before providing the signals to the group of antenna elements, or to apply the constant phase difference to signals on the different terminals after receiving the signals from the group of antenna elements.

As shown by reference number 515, the Butler matrixes may be coupled to switches. A switch may be configured with $M_{Hybrid}$ terminals coupled to a Butler matrix and $N_{Switch}$ terminals opposite the Butler matrix. In some aspects, the switch may be configured to select a number $N_{Switch}$ of the $M_{Hybrid}$ terminals to couple to the $N_{Switch}$ terminals. For example, the switch may receive input from the wireless communication device to select the $N_{Switch}$ terminals.

As shown by reference number 520, the $N_{Switch}$ terminals of the switch may be coupled to $N_{Switch}$ mixers and/or ADCs. In some aspects, a mixer and/or ADC converter may be used to combine signals from one or more of the $N_{Switch}$ terminals and/or may convert the signals from analog signals to digital signals. In some aspects, the $N_{Switch}$ terminals of the switch may be coupled to a digital to analog converter to convert digital signals from the wireless communication device to analog signals before providing the signals to the antenna elements via the Butler matrix and/or the switch.

As shown by reference number 525, the mixers and/or ADC converters may be coupled to $N_{Rx} \times N_{Switch}/M_{Hybrid}$ terminals and $N_{CC}$ digital beamformers for processing the signals into $N_{Streams}$. In some aspects, $N_{Rx} \times N_{Switch}/M_{Hybrid} = N_{Streams}$ and the digital beamformer may be passive (e.g., may not process the signals). In some aspects where $N_{Rx} \times N_{Switch}/M_{Hybrid} = N_{Streams}$, and where the streams do not overlap (e.g., the streams have spatial diversity), digital beamforming may not be required to separate the streams. In some aspects, digital beamforming may be applied to overlapping streams and not to non-overlapping streams. In this way, the wireless communication device may conserve power resources.

As shown by reference number 530, $N_{Streams}$ terminals of the digital beamformers may be coupled to $N_{Streams} \times N_{CCs}$ digital filters. As shown by reference number 535, the digitally filtered streams may then be processed by $N_{Streams} \times N_{CCs}$ FFT components to produce an FFT per component carrier for each of the $N_{streams} \times N_{CCs}$ streams. This may produce a number of $N_{Streams} \times N_{FFT} \times N_{CC}$ samples for further processing.

As indicated above, FIG. 5 is provided as an example. Other examples may differ from what is described with regard to FIG. 5.

Figure 6:
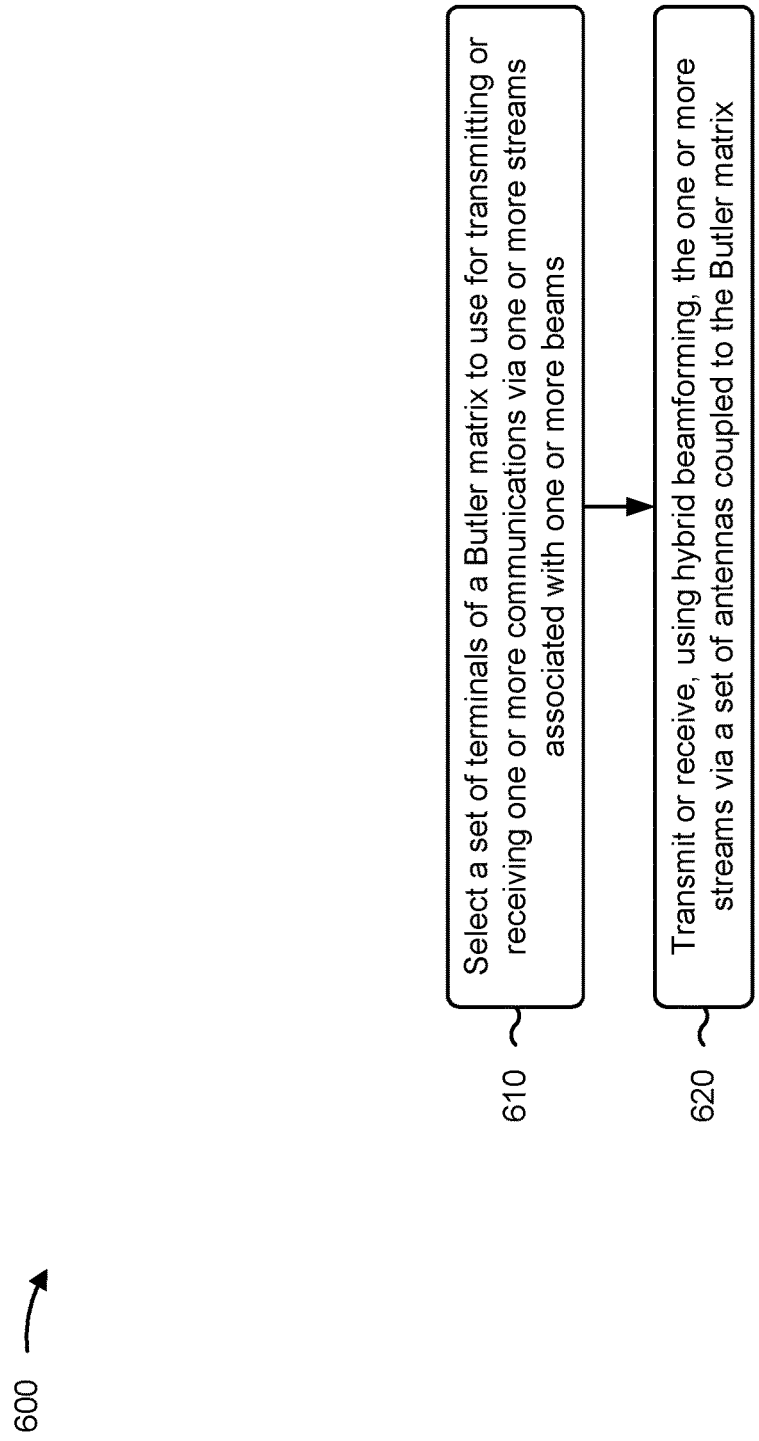
FIG. 6 is a diagram illustrating an example process associated with hybrid beamforming with a Butler matrix, in accordance with the present disclosure.

FIG. 6 is a diagram illustrating an example process 600 performed, for example, by a wireless communication device, in accordance with the present disclosure. Example process 600 is an example where the wireless communication device (e.g., base station 110, UE 120, and/or the like) performs operations associated with hybrid beamforming with a Butler matrix.

As shown in FIG. 6, in some aspects, process 600 may include selecting a set of terminals of a Butler matrix to use for transmitting or receiving one or more communications via one or more streams associated with one or more beams (block 610). For example, the wireless communication device (e.g., using receive processor 238, transmit processor 220, controller/processor 240, memory 242, receive processor 258, transmit processor 264, controller/processor 280, memory 282, and/or the like) may select a set of terminals of a Butler matrix to use for transmitting or receiving one or more communications via one or more streams associated with one or more beams, as described above.

As further shown in FIG. 6, in some aspects, process 600 may include transmitting or receiving, using hybrid beamforming, the one or more streams via a set of antenna elements coupled to the Butler matrix (block 620). For example, the wireless communication device (e.g., using receive processor 258, transmit processor 264, controller/processor 280, memory 282, and/or the like) may transmit or receive, using hybrid beamforming, the one or more streams via a set of antenna elements coupled to the Butler matrix, as described above.

Process 600 may include additional aspects, such as any single aspect or any combination of aspects described below and/or in connection with one or more other processes described elsewhere herein.

In a first aspect, transmitting or receiving the one or more streams via the set of antenna elements coupled to the Butler matrix includes receiving the one or more streams, and receiving the one or more streams includes receiving the one or more streams via the set of antenna elements, providing the one or more streams to the Butler matrix, and providing the one or more streams to a switch.

In a second aspect, alone or in combination with the first aspect, process 600 includes providing the one or more streams to one or more mixers and one or more analog to digital converters, and performing digital beamforming on the one or more streams via a digital beamformer.

In a third aspect, alone or in combination with one or more of the first and second aspects, transmitting or receiving the one or more streams via the set of antenna elements coupled to the Butler matrix comprises transmitting the one or more streams, and transmitting the one or more streams includes performing digital beamforming on the one or more streams via a digital beamformer, providing the one or more streams to the set of terminals of the Butler matrix, and transmitting the one or more streams via the set of antenna elements.

In a fourth aspect, alone or in combination with one or more of the first through third aspects, process 600 includes providing the one or more streams to a mixer and a digital to analog converter; and providing the one or more streams to an amplifier before transmitting the one or more streams via the set of antenna elements.

In a fifth aspect, alone or in combination with one or more of the first through fourth aspects, the Butler matrix includes a 2×2 Butler matrix, a 3×3 Butler matrix, a 4×4 Butler matrix, an 8×8 Butler matrix, a 9×9 Butler matrix, or a 16×16 Butler matrix.

In a sixth aspect, alone or in combination with one or more of the first through fifth aspects, the Butler matrix includes first terminals coupled to each antenna of an antenna array and second terminals coupled to a switch.

In a seventh aspect, alone or in combination with one or more of the first through sixth aspects, the Butler matrix is configured to receive the one or more communications via the one or more streams, and an additional Butler matrix is configured to transmit one or more additional communications via one or more additional streams.

In an eighth aspect, alone or in combination with one or more of the first through seventh aspects, the Butler matrix is configured to receive the one or more communications via the one or more streams as received via the set of antenna elements, an additional Butler matrix of the wireless communication device is also configured to receive the one or more communications via the one or more streams as received via an additional set of antenna elements, a product, of a number of output ports of switches coupled to the Butler matrix and the additional Butler matrix and a total number of antenna elements of the set of antenna elements and the additional set of antenna elements and a number of output ports of the switch, is equal to a number of streams of the one or more streams, and receiving the one or more streams comprises receiving the one or more streams without digital beamforming.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a wireless communication device, comprising: selecting a set of terminals of a Butler matrix to use for transmitting or receiving one or more communications via one or more streams associated with one or more beams; and transmitting or receiving, using hybrid beamforming, the one or more streams via a set of antenna elements coupled to the Butler matrix.

Aspect 2: The method of Aspect 1, wherein transmitting or receiving the one or more streams via the set of antenna elements coupled to the Butler matrix comprises receiving the one or more streams, and wherein receiving the one or more streams comprises: receiving the one or more streams via the set of antenna elements, providing the one or more streams to the Butler matrix, and providing the one or more streams to a switch.

Aspect 3: The method of Aspect 2, further comprising: providing the one or more streams to one or more mixers and one or more analog to digital converters; and performing digital beamforming on the one or more streams via a digital beamformer.

Aspect 4: The method of any of Aspects 1-3, wherein transmitting or receiving the one or more streams via the set of antenna elements coupled to the Butler matrix comprises transmitting the one or more streams, and wherein transmitting the one or more streams comprises: performing digital beamforming on the one or more streams via a digital beamformer, providing the one or more streams to the set of terminals of the Butler matrix, and transmitting the one or more streams via the set of antenna elements.

Aspect 5: The method of Aspect 4, further comprising: providing the one or more streams to a mixer and digital to analog converter; and providing the one or more streams to an amplifier before transmitting the one or more streams via the set of antenna elements.

Aspect 6: The method of any of Aspects 1-5, wherein the Butler matrix comprises a 2×2 Butler matrix, a 3×3 Butler matrix, a 4×4 Butler matrix, an 8×8 Butler matrix, a 9×9 Butler matrix, or a 16×16 Butler matrix.

Aspect 7: The method of any of Aspects 1-6, wherein the Butler matrix comprises first terminals coupled to each antenna of an antenna array and second terminals coupled to a switch.

Aspect 8: The method of any of Aspects 1-7, wherein the Butler matrix is configured to receive the one or more communications via the one or more streams, and wherein an additional Butler matrix is configured to transmit one or more additional communications via one or more additional streams.

Aspect 9: The method of any of Aspects 1-8, wherein the Butler matrix is configured to receive the one or more communications via the one or more streams as received via the set of antenna elements, wherein an additional Butler matrix of the wireless communication device is also configured to receive the one or more communications via the one or more streams as received via an additional set of antenna elements, wherein a product, of a number of output ports of switches coupled to the Butler matrix and the additional Butler matrix and a total number of antenna elements of the set of antenna elements and the additional set of antenna elements and a number of output ports of the switch, is equal to a number of streams of the one or more streams, and wherein receiving the one or more streams comprises receiving the one or more streams without digital beamforming.

Aspect 10: An apparatus for wireless communication at a device, comprising a Butler Matrix, a processor; memory coupled with the processor; and instructions stored in the memory and executable by the processor to cause the apparatus to perform the method of one or more of Aspects 1-9.

Aspect 11: A device for wireless communication, comprising a memory and one or more processors coupled to the memory, the one or more processors configured to perform the method of one or more of Aspects 1-9.

Aspect 12: An apparatus for wireless communication, comprising at least one means for performing the method of one or more of Aspects 1-9.

Aspect 13: A non-transitory computer-readable medium storing code for wireless communication, the code comprising instructions executable by a processor to perform the method of one or more of Aspects 1-9.

Aspect 14: A non-transitory computer-readable medium storing a set of instructions for wireless communication, the set of instructions comprising one or more instructions that, when executed by one or more processors of a device, cause the device to perform the method of one or more of Aspects 1-9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless communication device, comprising:
   selecting a set of terminals of a Butler matrix to use for transmitting or receiving one or more communications via one or more streams associated with one or more beams; and
   performing hybrid beamforming using the Butler matrix, wherein the performing the hybrid beamforming using the Butler matrix comprises:
      receiving the one or more streams via a set of antenna elements coupled to the Butler matrix,
      providing, based on receiving the one or more streams via the set of antenna elements, the one or more streams to the Butler matrix,
      providing, based on providing the one or more streams to the Butler matrix, the one or more streams to a switch,
      providing, based on providing the one or more streams to the switch, the one or more streams to one or more mixers,
         wherein the one or more streams are combined via the one or more mixers to form one or more combined streams,
      providing, based on providing the one or more streams to the one or more mixers, the one or more combined streams to one or more analog to digital converters, and
      performing, based on providing the one or more combined streams to the one or more analog to digital converters, digital beamforming on one or more overlapping streams and not on one or more non-overlapping streams of the one or more combined streams.

2. The method of claim 1, further comprising:
performing digital beamforming on one or more other streams via a digital beamformer,
providing the one or more other streams to the set of terminals of the Butler matrix, and
transmitting the one or more other streams via the set of antenna elements.

3. The method of claim 2, further comprising:
providing the one or more other streams to a mixer and digital to analog converter; and
providing the one or more other streams to an amplifier before transmitting the one or more other streams via the set of antenna elements.

4. The method of claim 1, wherein the Butler matrix comprises a 2×2 Butler matrix, a 3×3 Butler matrix, a 4×4 Butler matrix, an 8×8 Butler matrix, a 9×9 Butler matrix, or a 16×16 Butler matrix.

5. The method of claim 1, wherein the Butler matrix comprises first terminals coupled to each antenna of an antenna array and second terminals coupled to the switch.

6. The method of claim 1, further comprises:
receiving, via the Butler matrix, the one or more communications via the one or more streams, and
transmitting, via an additional Butler matrix, one or more additional communications via one or more additional streams.

7. The method of claim 1, further comprising:
receiving the one or more communications via the one or more streams as received via the set of antenna elements,
receiving the one or more communications via the one or more streams as received via an additional set of antenna elements coupled to an additional Butler matrix of the wireless communication device,
wherein a product, of a quantity of first output ports of switches coupled to the Butler matrix and the additional Butler matrix, a total quantity of antenna elements of the set of antenna elements and the additional set of antenna elements, and a quantity of second output ports of the switches, is equal to a quantity of streams of the one or more streams, and
wherein receiving the one or more streams comprises receiving the one or more streams without digital beamforming.

8. The method of claim 1, further comprising:
performing, based on performing the digital beamforming on the one or more overlapping streams, Fast Fourier Transform (FFT) processing on the one or more overlapping streams.

9. A wireless communication device for wireless communication, comprising:
a memory; and
one or more processors coupled to the memory, the one or more processors configured to cause the wireless communication device to:
select a set of terminals of a Butler matrix to use for transmitting or receiving one or more communications via one or more streams associated with one or more beams; and
perform hybrid beamforming using the Butler matrix, wherein the one or more processors, to cause the wireless communication device to perform the hybrid beamforming using the Butler matrix, are configured to cause the wireless communication device to:
receive the one or more streams via a set of antenna elements coupled to the Butler matrix,
provide, based on the one or more streams being received via the set of antenna elements, the one or more streams to the Butler matrix,
provide, based on the one or more streams being provided to the Butler matrix, the one or more streams to a switch,
provide, based on the one or more streams being provided to the switch, the one or more streams to one or more mixers,
wherein the one or more streams are combined via the one or more mixers to form one or more combined streams,
provide, based on the one or more streams being provided to the one or more mixers, the one or more combined streams to one or more analog to digital converters, and
perform, based on the one or more combined streams being provided to the one or more analog to digital converters, digital beamforming on one or more overlapping streams and not on one or more non-overlapping streams of the one or more combined streams.

10. The wireless communication device of claim 9, wherein the one or more processors are configured to cause the wireless communication device to:
provide one or more other streams to a digital beamformer for digital beamforming,
provide the one or more other streams to the set of terminals of the Butler matrix, and
transmit the one or more other streams via the set of antenna elements.

11. The wireless communication device of claim 10, wherein the one or more processors are further configured to cause the wireless communication device to:
provide the one or more other streams to a mixer and digital to analog converter; and
provide the one or more other streams to an amplifier before the one or more other streams being transmitted via the set of antenna elements.

12. The wireless communication device of claim 9, wherein the Butler matrix comprises a 2×2 Butler matrix, a 3×3 Butler matrix, a 4×4 Butler matrix, an 8×8 Butler matrix, a 9×9 Butler matrix, or a 16×16 Butler matrix.

13. The wireless communication device of claim 9, wherein the Butler matrix comprises first terminals coupled to each antenna of the set of antennas elements and second terminals coupled to the switch.

14. The wireless communication device of claim 9, wherein the Butler matrix is configured to receive the one or more communications via the one or more streams, and
wherein an additional Butler matrix is configured to transmit one or more additional communications via one or more additional streams.

15. The wireless communication device of claim 9, wherein the Butler matrix is configured to receive the one or more communications via the one or more streams as received via the set of antenna elements,
wherein an additional Butler matrix of the wireless communication device is also configured to receive the one or more communications via the one or more streams as received via an additional set of antenna elements,
wherein a product, of a quantity of first output ports of switches coupled to the Butler matrix and the additional Butler matrix, a total quantity of antenna elements of the set of antenna elements and the additional set of antenna elements, and a quantity of second output ports of the switches, is equal to a quantity of streams of the one or more streams, and wherein the one or more processors, to cause the wireless communication device to receive the one or more streams, are configured to cause the wireless communication device to receive the one or more streams without digital beamforming.

16. The wireless communication device of claim 9, wherein the one or more processors are configured to cause the wireless communication device to:

perform, based on the digital beamforming being performed on the one or more overlapping streams, Fast Fourier Transform (FFT) processing on the one or more overlapping streams.

17. A non-transitory computer-readable medium storing a set of instructions for wireless communication, the set of instructions comprising:

one or more instructions that, when executed by one or more processors of a wireless communication device, cause the wireless communication device to:
  select a set of terminals of a Butler matrix to use for transmitting or receiving one or more communications via one or more streams associated with one or more beams; and
  perform hybrid beamforming using the Butler matrix,
    wherein the one or more instructions, that cause the wireless communication device to perform the hybrid beamforming using the Butler matrix, cause the wireless communication device to:
      receive the one or more streams via a set of antenna elements coupled to the Butler matrix,
      provide, based on receiving the one or more streams via the set of antenna elements, the one or more streams to the Butler matrix,
      provide, based on providing the one or more streams to the Butler matrix, the one or more streams to a switch,
      provide, based on providing the one or more streams to the switch, the one or more streams to one or more mixers,
        wherein the one or more streams are combined via the one or more mixers to form one or more combined streams,
      provide, based on providing the one or more streams to the one or more mixers, the one or more combined streams to one or more analog to digital converters, and
      perform, based on providing the one or more combined streams to the one or more analog to digital converters, digital beamforming on one or more overlapping streams and not on one or more non-overlapping streams of the one or more combined streams.

18. The non-transitory computer-readable medium of claim 17, wherein the one or more instructions further cause the wireless communication device to:

perform digital beamforming on one or more other streams via a digital beamformer,
provide the one or more other streams to the set of terminals of the Butler matrix, and
transmit the one or more other streams via the set of antenna elements.

19. The non-transitory computer-readable medium of claim 17, wherein the Butler matrix comprises a 2×2 Butler matrix, a 3×3 Butler matrix, a 4×4 Butler matrix, an 8×8 Butler matrix, a 9×9 Butler matrix, or a 16×16 Butler matrix.

20. The non-transitory computer-readable medium of claim 17, wherein the one or more instructions further cause the wireless communication device to:

receive the one or more communications via the one or more streams, and
transmit one or more additional communications via one or more additional streams.

21. The non-transitory computer-readable medium of claim 17, wherein the one or more instructions further cause the wireless communication device to:

receive the one or more communications via the one or more streams as received via the set of antenna elements, and
receive the one or more communications via the one or more streams as received via an additional set of antenna elements coupled to an additional Butler matrix of the wireless communication device,
  wherein a product, of a quantity of first output ports of switches coupled to the Butler matrix and the additional Butler matrix, a total quantity of antenna elements of the set of antenna elements and the additional set of antenna elements, and a quantity of second output ports of the switches, is equal to a quantity of streams of the one or more streams; and
wherein the one or more instructions, that cause the wireless communication device to receive the one or more streams, cause the wireless communication device to receive the one or more streams without digital beamforming.

22. The non-transitory computer-readable medium of claim 17, wherein the one or more instructions further cause the wireless communication device to:

provide, based on providing the one or more combined streams to the one or more analog to digital converters, one or more overlapping streams of the one or more combined streams to a digital beamformer for digital beamforming.

23. The non-transitory computer-readable medium of claim 18, wherein the one or more instructions further cause the wireless communication device to:

provide the one or more streams to a mixer and digital to analog converter; and
provide the one or more streams to an amplifier before transmitting the one or more streams via the set of antenna elements.

24. The non-transitory computer-readable medium of claim 20, wherein the one or more instructions, that cause the wireless communication device to transmit the one or more additional communications, cause the wireless communication device to:

transmit the one or more additional communications via an additional Butler matrix.

25. The non-transitory computer-readable medium of claim 17, wherein the Butler matrix comprises first terminals coupled to each antenna of the set of antennas elements and second terminals coupled to the switch.

26. An apparatus for wireless communication, comprising:

means for selecting a set of terminals of a Butler matrix to use for transmitting or receiving one or more communications via one or more streams associated with one or more beams; and
means for performing hybrid beamforming using the Butler matrix, wherein the means for performing the hybrid beamforming using the Butler matrix comprises:
  means for receiving the one or more streams via a set of antenna elements coupled to the Butler matrix,
  means for providing, based on receiving the one or more streams via the set of antenna elements, the one or more streams to the Butler matrix,
  means for providing, based on providing the one or more streams to the Butler matrix, the one or more streams to a switch,
  means for providing, based on providing the one or more streams to the switch, the one or more streams to one or more mixers,
    wherein the one or more streams are combined via the one or more mixers to form one or more combined streams,
  means for providing, based on providing the one or more streams to the one or more mixers, the one or more combined streams to one or more analog to digital converters, and
  means for performing, based on providing the one or more combined streams to the one or more analog to digital converters, digital beamforming on one or more overlapping streams and not on one or more non-overlapping streams of the one or more combined streams.

27. The apparatus of claim 26, further comprising:
means for performing digital beamforming on one or more other streams via a digital beamformer,
means for providing the one or more other streams to the set of terminals of the Butler matrix, and
means for transmitting the one or more other streams via the set of antenna elements.

28. The apparatus of claim 26, wherein the Butler matrix comprises a 2×2 Butler matrix, a 3×3 Butler matrix, a 4×4 Butler matrix, an 8×8 Butler matrix, a 9×9 Butler matrix, or a 16×16 Butler matrix.

29. The apparatus of claim 26, further comprising:
means for receiving the one or more communications via the one or more streams, and
means for transmitting one or more additional communications via one or more additional streams.

30. The apparatus of claim 26, further comprising:
means for receiving the one or more communications via the one or more streams as received via the set of antenna elements,
means for receiving the one or more communications via the one or more streams as received via an additional set of antenna elements coupled to an additional Butler matrix,
  wherein a product, of a quantity of first output ports of switches coupled to the Butler matrix and the additional Butler matrix, a total quantity of antenna elements of the set of antenna elements and the additional set of antenna elements, and a quantity of second output ports of the switches, is equal to a quantity of streams of the one or more streams; and
  wherein the means for receiving the one or more streams comprises means for receiving the one or more streams without digital beamforming.

* * * * *